(12) United States Patent
Carmen et al.

(10) Patent No.: US 9,141,101 B2
(45) Date of Patent: Sep. 22, 2015

(54) WIRELESS BATTERY-POWERED REMOTE CONTROL WITH GLOW-IN-THE-DARK FEATURE

(75) Inventors: Lawrence R. Carmen, Bath, PA (US); Matthew Philip McDonald, Phoenixville, PA (US); Walter S. Zaharchuk, Macungie, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 709 days.

(21) Appl. No.: 13/469,140

(22) Filed: May 11, 2012

(65) Prior Publication Data

US 2012/0286675 A1    Nov. 15, 2012

Related U.S. Application Data

(60) Provisional application No. 61/485,936, filed on May 13, 2011.

(51) Int. Cl.
    *G05B 19/00* (2006.01)
    *G08C 17/02* (2006.01)
(52) U.S. Cl.
    CPC ............... *G05B 19/00* (2013.01); *G08C 17/02* (2013.01); *G08C 2201/12* (2013.01)
(58) Field of Classification Search
    USPC .................................................. 315/149–159
    See application file for complete search history.

(56) References Cited

U.S. PATENT DOCUMENTS

| 7,005,679 B2* | 2/2006 | Tarsa et al. ...................... 257/89 |
| 8,760,075 B1* | 6/2014 | Tischler et al. ............... 315/291 |
| 2004/0144015 A1 | 7/2004 | Yu |
| 2005/0218838 A1* | 10/2005 | Lys ............................... 315/291 |
| 2009/0110612 A1* | 4/2009 | Hyde et al. .................... 422/129 |
| 2010/0129702 A1* | 5/2010 | Milner .......................... 429/100 |
| 2011/0285292 A1* | 11/2011 | Mollnow et al. .............. 315/113 |

OTHER PUBLICATIONS

International Preliminary Report on Patentability dated Nov. 28, 2013 issued in PCT International Application No. PCT/US12/037430.

* cited by examiner

*Primary Examiner* — Brandon S Cole
(74) *Attorney, Agent, or Firm* — Ostrolenk Faber LLP

(57) ABSTRACT

A glow-in-the-dark night light for a control device allows the control device to be easily found when the control device is located in a dark space. The night light may be provided on an actuator of the control device and may comprises a glow-in-the-dark material that has a luminance spectrum that decays with time after initial excitation. The night light is illuminated by an electromagnetic-energy-generating element to periodically recharge the glow-in-the-dark material with adequate energy to keep the glow-in-the-dark material visible in low ambient light conditions. The electromagnetic-energy-generating element draws relatively little current, such that the night light may be provided in a battery-powered remote control that has an acceptable battery lifetime.

21 Claims, 11 Drawing Sheets

WIRELESS BATTERY-POWERED REMOTE CONTROL WITH GLOW-IN-THE-DARK FEATURE

CROSS REFERENCES TO RELATED APPLICATIONS

This application is a non-provisional application of commonly-assigned U.S. Provisional Application No. 61/485,936, filed May 13, 2011, entitled WIRELESS BATTERY-POWERED REMOTE CONTROL WITH GLOW-IN-THE-DARK FEATURE, the entire disclosures of which are hereby incorporated by reference.

BACKGROUND OF THE INVENTION

1. Field of the Invention

The present invention relates to a wireless battery-powered remote control for remotely controlling the operation of an electric or electronic device. In particular, the invention can be used with a wireless load control system for controlling the amount of power delivered to an electrical load from a source of alternating-current (AC) power, and more particularly, with a remote control for a radio-frequency (RF) lighting control system. Even more particularly, the invention relates to a wireless battery powered remote control having a "glow-in-the-dark" or "night light" feature so that it can be located in the dark.

2. Description of the Related Art

Control systems for controlling the power delivered from an alternating-current (AC) power source to electrical loads, such as lights, motorized window treatments, and fans, are known. Such control systems often use the transmission of radio-frequency (RF) signals to provide wireless communication between the control devices of the system. The prior art lighting control systems include wireless load control devices, such as wall-mounted and table top dimmer switches. The dimmer switches included toggle actuators for turning controlled lighting loads on and off, and intensity adjustment actuators (e.g., rocker switches) for increasing and decreasing the intensities of the lighting loads. The dimmer switches also included one or more visual indicators, e.g., light-emitting diodes (LEDs), for providing feedback of the status of the lighting loads to users of the lighting control system.

The prior art wireless lighting control system also includes wireless remote controls, such as, wall-mounted and table top master controls (e.g., keypads) and car visor controls. The master controls of the prior art lighting control system each include a plurality of buttons and transmit RF signals to the dimmer switches to control the intensities of the controlled lighting loads. The master controls may also each include one or more visual indicators (i.e., LEDs) for providing feedback to the users of the lighting control system. The car visor controls are able to be clipped to the visor of an automobile and include one or more buttons for controlling the lighting loads of the lighting control system. An example of a prior art RF lighting control system is disclosed in commonly-assigned U.S. Pat. No. 5,905,442, issued on May 18, 1999, entitled METHOD AND APPARATUS FOR CONTROLLING AND DETERMINING THE STATUS OF ELECTRICAL DEVICES FROM REMOTE LOCATIONS, the entire disclosure of which is hereby incorporated by reference.

In order to make it easy for the users of the control system to find the control devices in a dark room, the control devices of prior art lighting control systems have often included night light features. For example, some prior art dimmer switches illuminated one or more of the visual indicators to a dim level when the controlled lighting load was off to provide a night light. In addition, some prior art dimmer switches dimly backlit one or more of the actuators when the controlled lighting load was off. However, if the dimmer switch is a "two-wire" device without a connection to the neutral side of the AC power source, the current required to illuminate the night light often needs to be conducted through the lighting load. When the magnitude of the current conducted through the lighting loads is too great, the lighting loads may flicker or provide otherwise poor performance.

Some master controls of the prior art load control system were powered from the AC power source and provided night light features, for example, by dimly illuminating one or more of the visual indicators. However, some of the wireless remote controls of the prior art lighting control systems were powered by batteries, which have limited lifetimes that are dependent upon the usage and the total current drawn from the batteries as well as how often the remote controls are used. The prior art battery-powered remote controls did not provide night lights, and simply illuminated the visual indicators for a period of time after one of the buttons of the remote control was actuated.

Therefore, there is a need for a low-power night light for use in battery-powered remote controls and two-wire load control devices.

SUMMARY OF THE INVENTION

The present invention provides a glow-in-the-dark night light for a control device that allows the control device to be easily found when the control device is located in a dark space. The night light is illuminated by an electromagnetic-energy-generating element to periodically recharge glow-in-the-dark material with adequate energy to keep the glow-in-the-dark material visible in low ambient light conditions. The electromagnetic-energy-generating element draws relatively little current, such that the night light may be provided in a battery-powered remote control that has an acceptable battery lifetime.

According to an embodiment of the invention, a remote control for a wireless control system comprises: (1) a controller; (2) a wireless transmitter coupled to the controller; (3) a battery for powering the controller and the transmitter; (4) a housing for the controller, the transmitter, and the battery; (5) an indicator device comprising a glow-in-the-dark material that has a luminance spectrum that decays with time after initial excitation; and (6) an electromagnetic-energy-generating element for producing electro-magnetic energy to excite the glow-in-the-dark material to produce visible light to enable the remote control to be visible in low ambient light conditions. The controller provides a pulse of electrical energy to the electromagnetic energy generating element on a periodic basis thereby to reduce energy usage from the battery. The pulse periodically recharges the glow-in-the-dark material with adequate energy to keep the glow-in-the-dark material visible in the low ambient light conditions.

According to another embodiment of the present invention, a control device for controlling an electrical load receiving power from a power source comprises: (1) a housing for containing control electronics, said housing having a front enclosure portion; (2) at least one actuator located within an area of said front enclosure portion, said control electronics responsive to actuations of said actuator, said front enclosure portion and said actuator being made of a molded plastic, at least one of said front enclosure portion and said actuator containing an afterglow phosphorescent pigment; and (3) an electromagnetic energy generating element mounted within said housing for producing electromagnetic energy directed toward said afterglow phosphorescent pigment to excite said afterglow phosphorescent pigment to produce visible light to render said control visible in low ambient light conditions.

Other features and advantages of the present invention will become apparent from the following description of the invention that refers to the accompanying drawings.

DETAILED DESCRIPTION OF THE INVENTION

Figure 1:
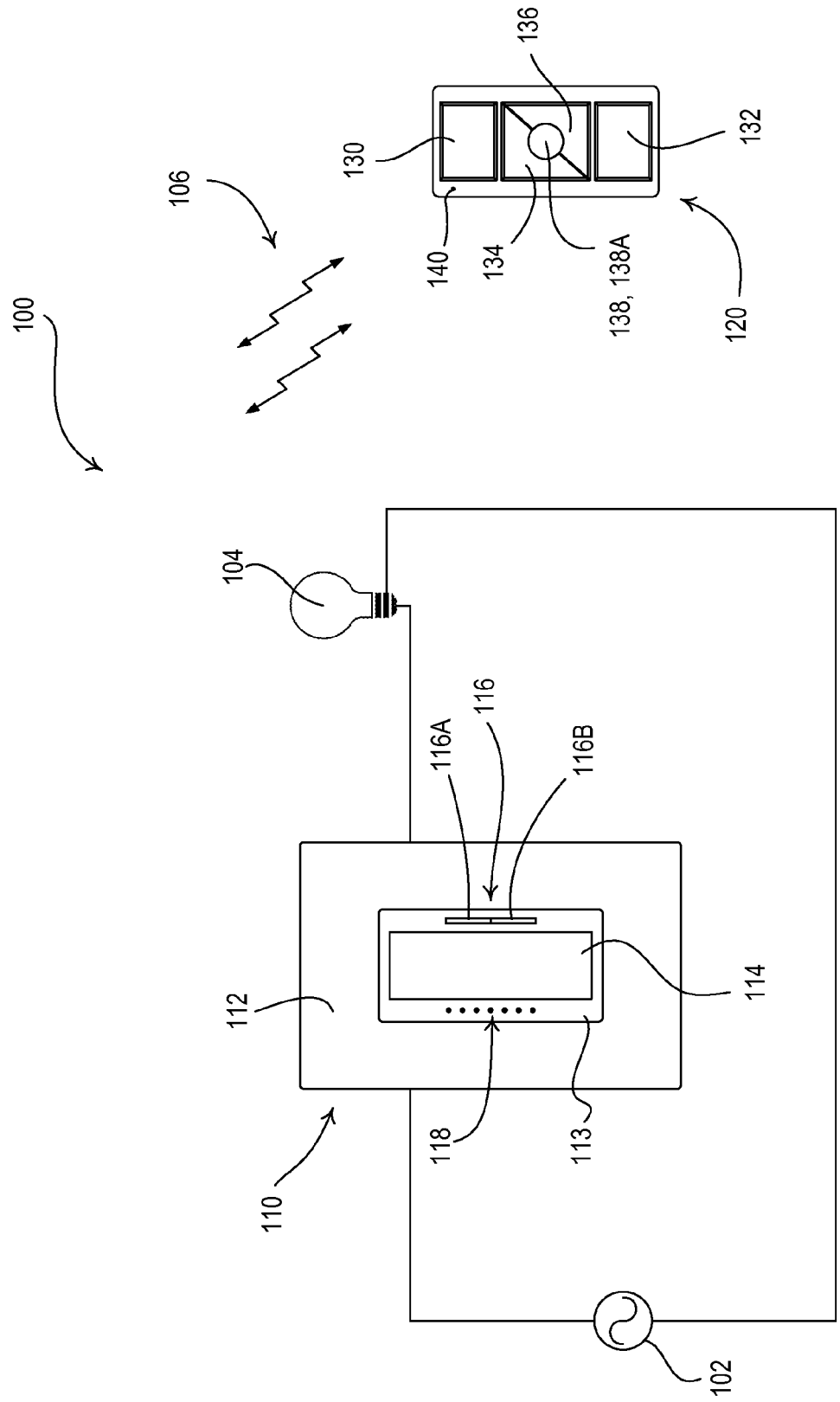
FIG. 1 is a simplified diagram of an RF lighting control system comprising a dimmer switch and a remote control.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified diagram of an RF load control system 100 comprising a remotely-controllable load control device (e.g., a dimmer switch 110) and a remote control 120. The dimmer switch 110 is adapted to be wall-mounted in a standard electrical wallbox and includes a wallplate 112. The dimmer switch 110 is coupled in series electrical connection between an alternating-current (AC) power source 102 and an electrical lighting load 104 for controlling the amount of power delivered to the lighting load. The dimmer switch 110 comprises a bezel 113 received in an opening of the faceplate 112. Alternatively, the RF lighting control system 100 may comprise another type of remotely-controllable load control device, for example, a remotely-controllable electronic dimming ballast, a plug-in load control device, a motor control device, or a motorized window treatment, such as, a roller shade or a drapery.

The dimmer switch 110 comprises a toggle actuator 114 (i.e., a control button) and an intensity adjustment actuator 116 (e.g., a rocker switch). Actuations of the toggle actuator 114 toggle, i.e., alternately turn off and on, the lighting load 104. The dimmer switch 110 may be programmed with a lighting preset intensity (i.e., a "favorite" intensity level), such that the dimmer switch is operable to control the intensity of the lighting load 104 to the preset intensity when the lighting load is turned on by an actuation of the toggle actuator 114. Actuations of an upper portion 116A or a lower portion 116B of the intensity adjustment actuator 116 respectively increase or decrease the amount of power delivered to the lighting load 104 and thus increase or decrease the intensity of the lighting load.

A plurality of visual indicators 118, e.g., light-emitting diodes (LEDs), are arranged in a linear array on the left-side of the bezel 113. The visual indicators 118 are illuminated to provide feedback of the present intensity of the lighting load 104. The dimmer switch 110 illuminates one of the plurality of visual indicators 118, which is representative of the present light intensity of the lighting load 104. An example of a dimmer switch having a toggle actuator 114 and an intensity adjustment actuator 116 is described in greater detail in U.S. Pat. No. 5,248,919, issued Sep. 29, 1993, entitled LIGHTING CONTROL DEVICE, the entire disclosure of which is hereby incorporated by reference.

Figure 2:
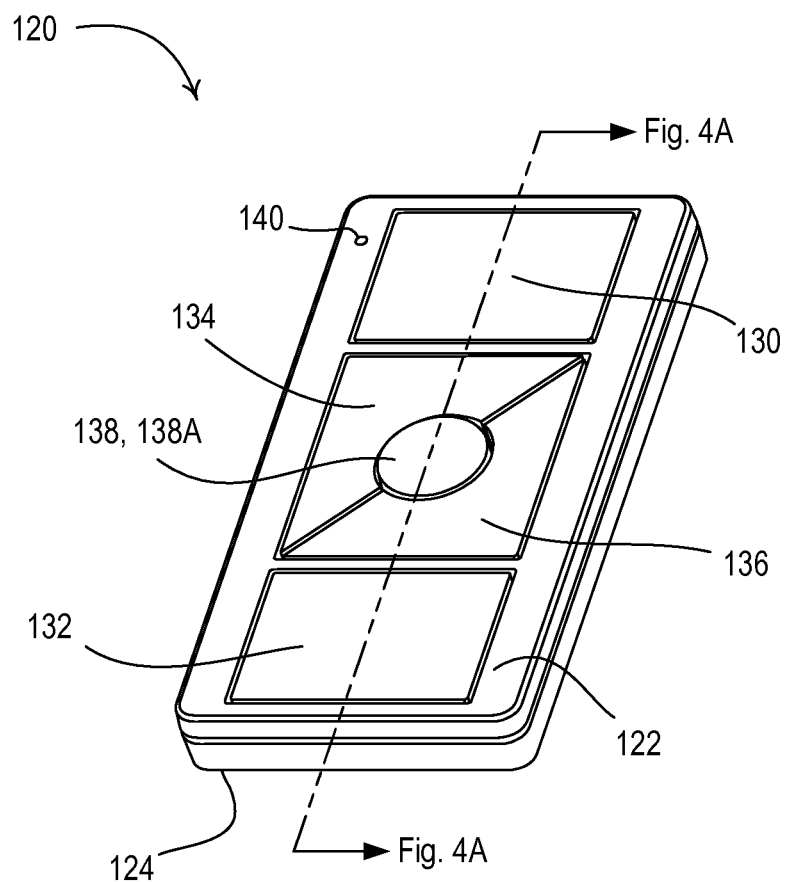
FIG. 2 is a perspective view of the remote control of FIG. 1.

FIG. 2 is a perspective view of the remote control 120. The remote control 120 comprises a housing that includes a front enclosure portion 122 and a rear enclosure portion 124 for containing control electronics of the remote control. The remote control 120 further comprises a plurality of actuators (i.e., an on button 130, an off button 132, a raise button 134, a lower button 136, and a preset button 138). The remote control 120 also comprises a visual indicator 140, which is illuminated temporarily in response to the actuation of one of the buttons 130-138. The remote control 120 transmits packets (i.e., messages) via RF signals 106 (i.e., wireless transmissions) to the dimmer switch 110 in response to actuations of any of the actuators. A packet transmitted by the remote control 120 includes, for example, a preamble, a serial number associated with the remote control, and a command (e.g., on, off, preset, etc.) that is representative of the actuated actuator. During a setup procedure of the RF load control system 100, the dimmer switch 110 is associated with one or more remote controls 120. The dimmer switch 110 is then responsive to packets containing the serial number of the remote control 120 to which the dimmer switch is associated. The dimmer switch 110 may be associated with the remote control 120 during a manufacturing process of the dimmer switch and the remote control, or after installation of the dimmer switch and the remote control.

The dimmer switch 110 is operable to turn on and to turn off the lighting load 104 in response to receiving the RF signals 106 representative of an actuation of the on button 130 and the off button 132, respectively, of the remote control 120. The dimmer switch 110 is operable to control the lighting load 104 to the preset intensity in response to receiving the RF signals 106 representative of an actuation of the preset button 138. In addition, the dimmer switch 110 is operable to increase and decrease the intensity of the lighting load 104 to the preset intensity in response to receiving the RF signals 106 representative of an actuation of the raise button 134 and lower button 136, respectively.

In the embodiment shown, one of the buttons, i.e., preset button 138, also serves as a glow-in-the-dark night light 138A. Another button or another indicator can alternatively be used. Accordingly, as discussed below, the preset button 138 is made of a special glow-in-the-dark material and serves as the glow-in-the-dark night light 138A, thereby enabling a user to locate the remote control 120 in low light conditions.

Figure 3A:
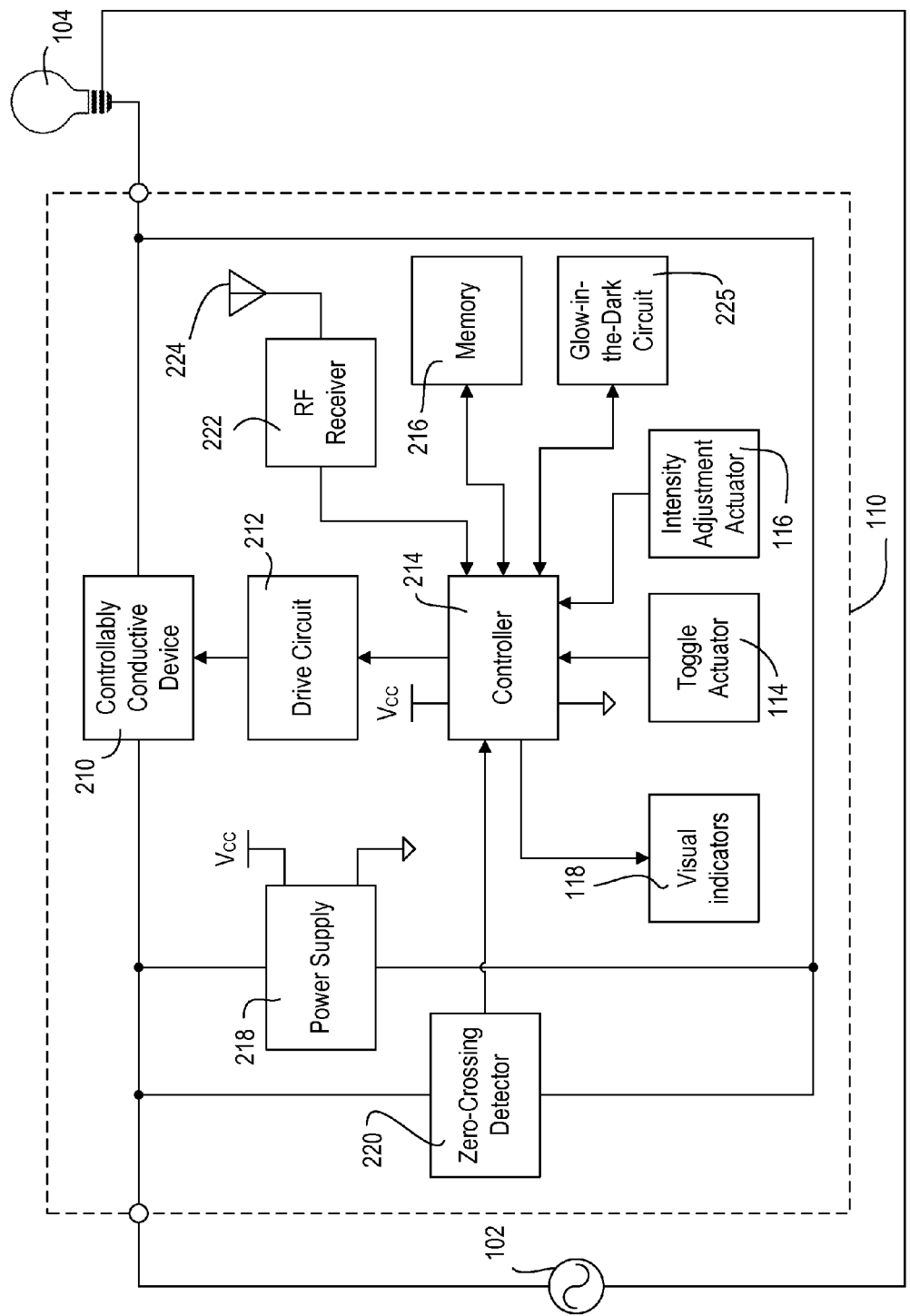
FIG. 3A is a simplified block diagram of the dimmer switch of FIG. 1.

FIG. 3A is a simplified block diagram of the dimmer switch 110. The dimmer switch 110 comprises a controllably conductive device 210 coupled in series electrical connection between the AC power source 102 and the lighting load 104 for control of the power delivered to the lighting load. The controllably conductive device 210 may comprise any suitable type of bidirectional semiconductor switch, such as, for example, a triac, a field-effect transistor (FET) in a rectifier bridge, or two FETs in anti-series connection. The controllably conductive device 210 includes a control input coupled to a drive circuit 212. The input provided to the control input of the controllably conductive device 210 will render the controllably conductive device conductive or non-conductive, which in turn controls the power supplied to the lighting load 104.

The drive circuit 212 provides control inputs to the controllably conductive device 210 in response to command signals from a controller 214. The controller 214 may be implemented as a microcontroller, a microprocessor, a programmable logic device (PLD), an application specific integrated circuit (ASIC), a field-programmable gate array (FPGA), or any suitable processing device. The controller 214 receives inputs from the toggle actuator 114 and the intensity adjustment actuator 116 and controls the visual indicators 118. The controller 214 is also coupled to a memory 216 for storage of the preset intensity of lighting load 104 and the serial number of the remote control 120 to which the dimmer switch 110 is associated. A power supply 218 generates a direct-current (DC) voltage $V_{CC}$ for powering the controller 214, the memory 216, and other low-voltage circuitry of the dimmer switch 110.

A zero-crossing detector 220 determines the zero-crossings of the input AC waveform from the AC power supply 102. A zero-crossing is defined as the time at which the AC supply voltage transitions from positive to negative polarity, or from negative to positive polarity, at the beginning of each half-cycle. The controller 214 provides the control inputs to the drive circuit 212 to operate the controllably conductive device 210 (i.e., to provide voltage from the AC power supply 102 to the lighting load 104) at predetermined times relative to the zero-crossing points of the AC waveform using a phase controlled dimming technique.

The dimmer switch 110 further comprises an RF receiver 222 and an antenna 224 for receiving the RF signals 106 from the remote control 120. The controller 214 is operable to control the controllably conductive device 210 in response to the packets received via the RF signals 106. Examples of the antenna 224 for wall-mounted dimmer switches, such as the dimmer switch 110, are described in greater detail in U.S. Pat. No. 5,982,103, issued Nov. 9, 1999, and U.S. patent application Ser. No. 10/873,033, filed Jun. 21, 2006, both entitled COMPACT RADIO FREQUENCY TRANSMITTING AND RECEIVING ANTENNA AND CONTROL DEVICE EMPLOYING SAME, the entire disclosures of which are hereby incorporated by reference.

Figure 3B:
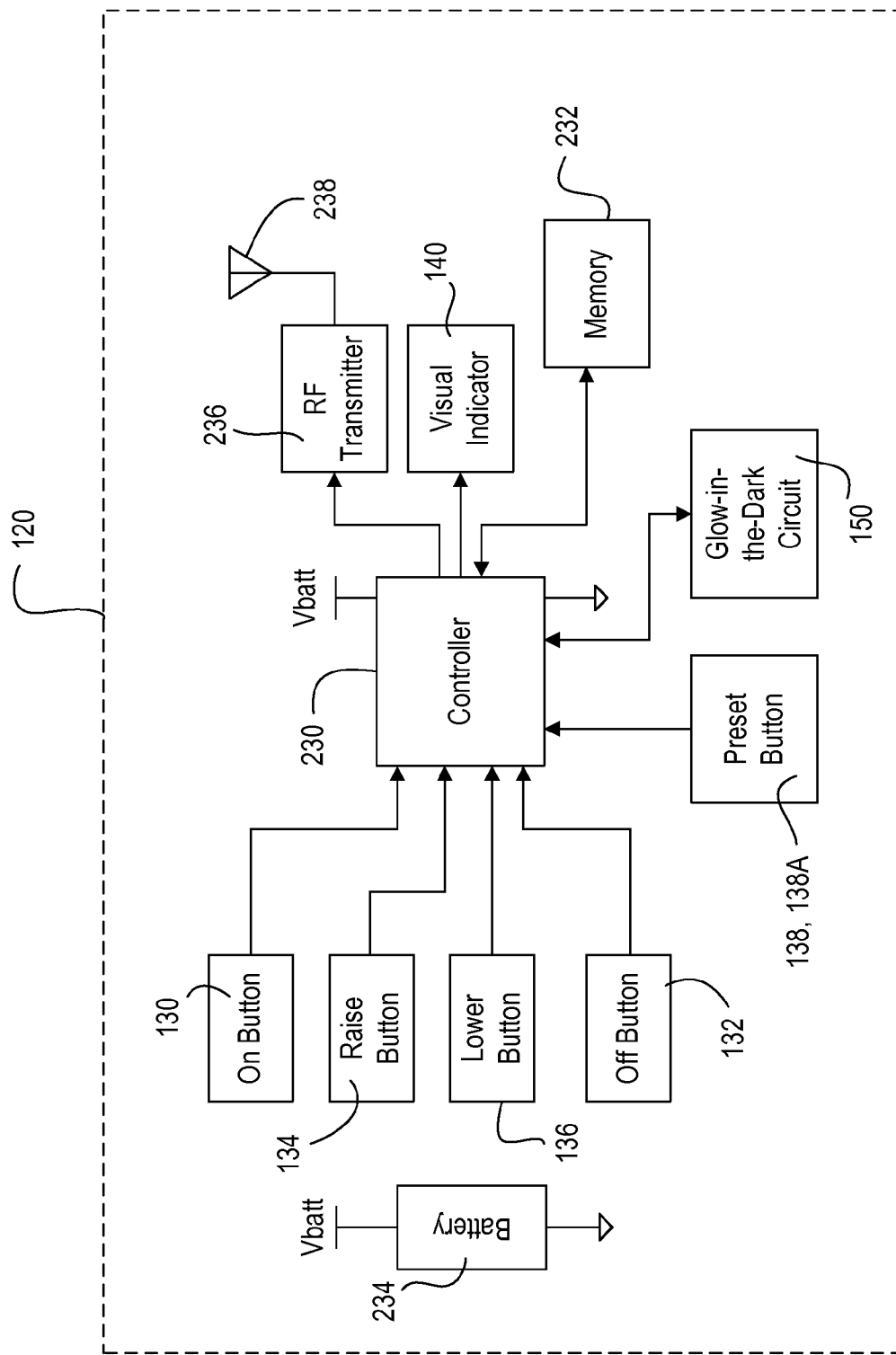
FIG. 3B is a simplified block diagram of the remote control of FIG. 1.

FIG. 3B is a simplified block diagram of the remote control 120. The remote control 120 comprises a controller 230, which is operable to receive inputs from the buttons 130-138 and to control the visual indicator 140. The controller 230 is coupled to a glow-in-the-dark circuit 150 used to illuminate the glow-in-the-dark night light 138A which will be described in greater detail below. The remote control 120 comprises a memory 232 for storage of the serial number, i.e., a unique identifier, of the remote control. For example, the serial number comprises a seven-byte number that is programmed into the memory 232 during manufacture of the remote control 120. Two series-coupled batteries 234A, 234B (FIG. 4A) provide a DC voltage $V_{BATT}$ (e.g., approximately 6 volts) for powering the controller 230, the memory 232, and other low-voltage circuitry of the remote control 120. For example, each of the batteries 234A, 234B may comprise a 3-V lithium coin battery, such as, part number CR2016 manufactured by Energizer. Alternatively, the remote control 120 could comprise, for example, only one 3-V lithium coin battery, such as, part number CR2032 manufactured by Energizer. In addition, the remote control 120 could comprise a super capacitor or other suitable power source for powering the controller 230, the memory 232, and other low-voltage circuitry of the remote control.

The remote control 120 further includes an RF transmitter 236 coupled to the controller 230 and an antenna 238, which may comprise, for example, a loop antenna. In response to an actuation of one of the on button 130, the off button 132, the raise button 134, the lower button 136, and the preset button 138, the controller 230 causes the RF transmitter 236 to transmit a packet to the dimmer switch 110 via the RF signals 106. As previously mentioned, each transmitted packet comprises a preamble, the serial number of the remote control 120, which is stored in the memory 232, and a command indicative as to which of the five buttons was actuated (i.e., on, off, raise, lower, or preset).

Alternatively, the RF receiver 222 of the dimmer switch 110 and the RF transmitter of the remote control 120 could both comprise RF transceivers to allow for two-way RF communication between the remote control and the dimmer switch. Example of two-way RF lighting control systems are described in greater detail in co-pending, commonly-assigned U.S. patent application Ser. No. 12/033,223, filed Feb. 19, 2008, entitled COMMUNICATION PROTOCOL FOR A RADIO-FREQUENCY LOAD CONTROL SYSTEM, and U.S. patent application Ser. No. 13/415,537, filed Mar. 8, 2012, entitled LOW-POWER RADIO-FREQUENCY RECEIVER, the entire disclosure of which is hereby incorporated by reference.

Figure 4A:
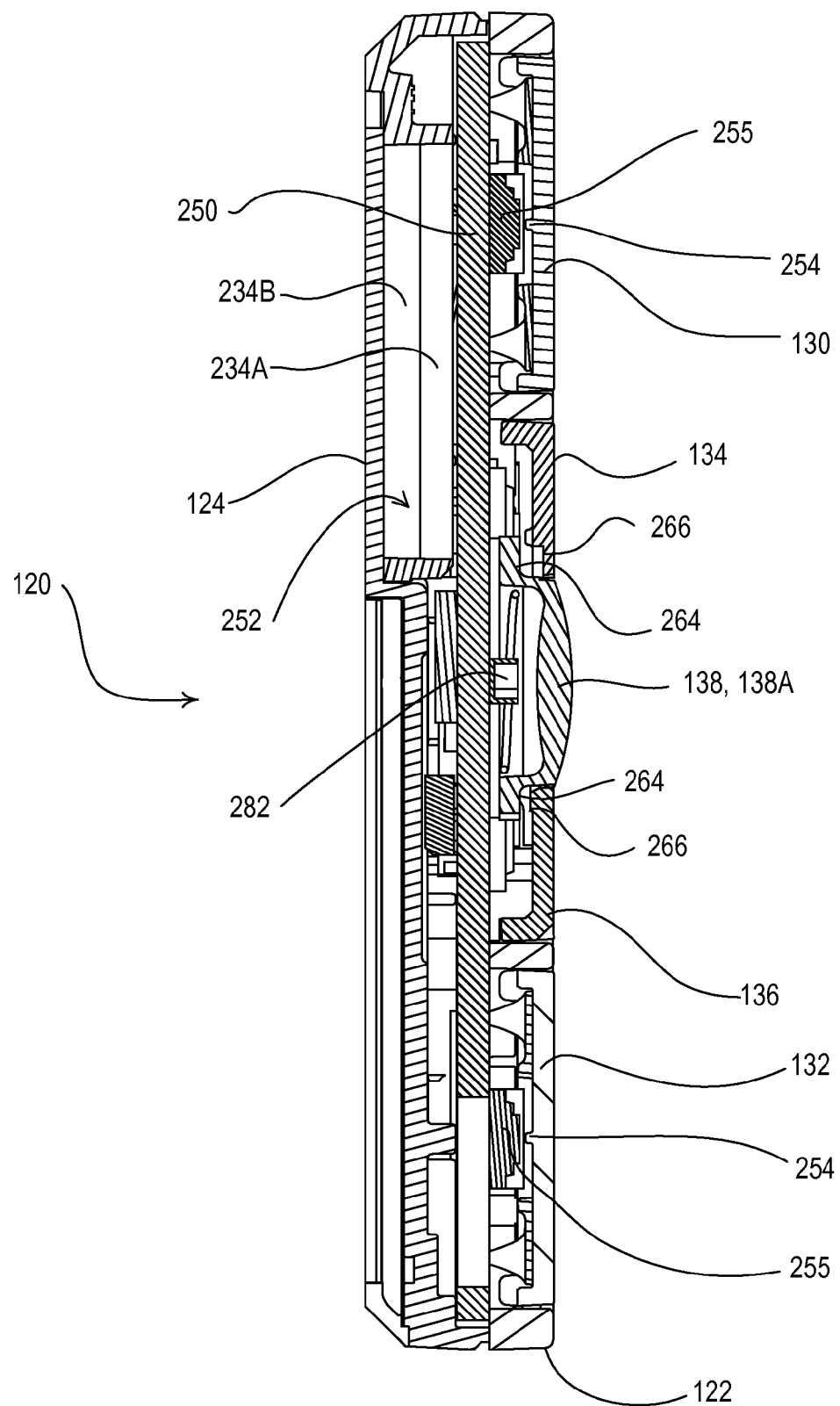
FIG. 4A is a left-side cross-sectional view of the remote control of FIG. 1 taken through the center of the remote control.

FIG. 4A is a left-side cross-sectional view of the remote control 120 taken through the center of the remote control as shown in FIG. 2. The electrical circuitry of the remote control 120 (as shown in FIG. 3B) is mounted to a printed circuit board (PCB) 250, which is housed between the front enclosure portion 122 and the rear enclosure portion 124. The batteries 234A, 234B are located in a battery enclosure portion 252 and are electrically coupled to the circuitry on the PCB 250. The battery enclosure portion 252 is slidably received in the rear enclosure portion 124, such that the battery enclosure portion may be pulled away from the rear enclosure portion 124 to allow for replacement of the batteries 234A, 234B. FIG. 4A shows two batteries 234A, 234B, but a single battery can be employed. The structure of the remote control 120 is described in greater detail in U.S. patent application Ser. No. 12/399,126, filed Mar. 6, 2009, entitled WIRELESS BATTERY-POWERED REMOTE CONTROL HAVING MULTIPLE MOUNTING MEANS, the entire disclosure of which is hereby incorporated by reference.

Figure 4C:
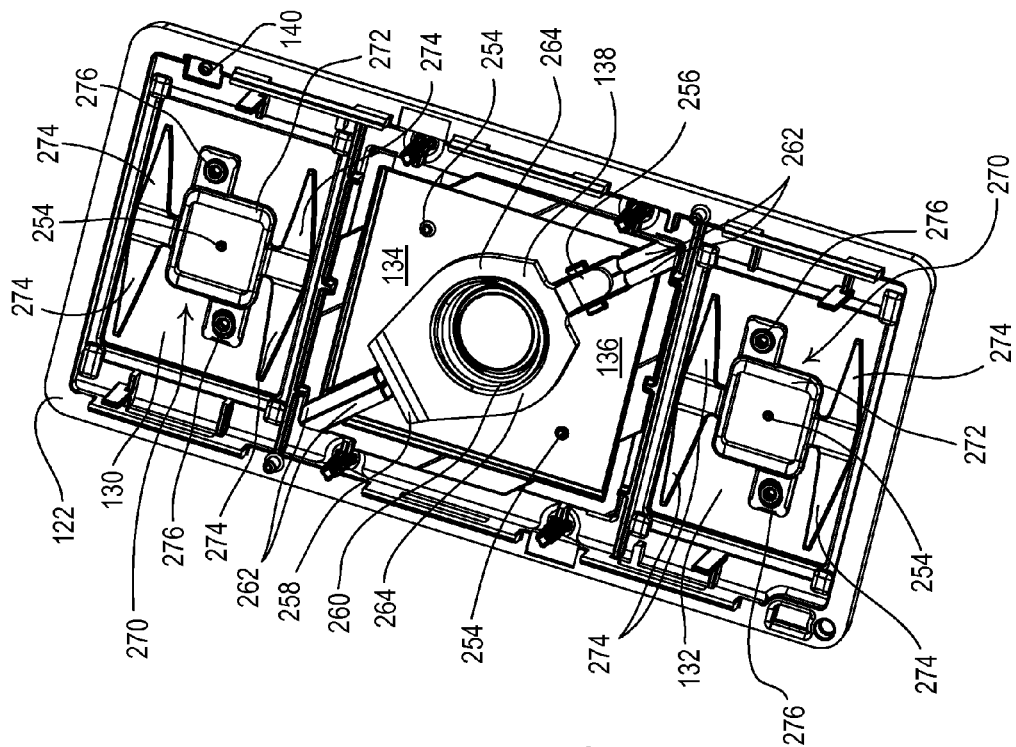
FIG. 4C is a rear perspective view of a front enclosure portion and a plurality of buttons of the remote control of FIG. 1.
Figure 4B:
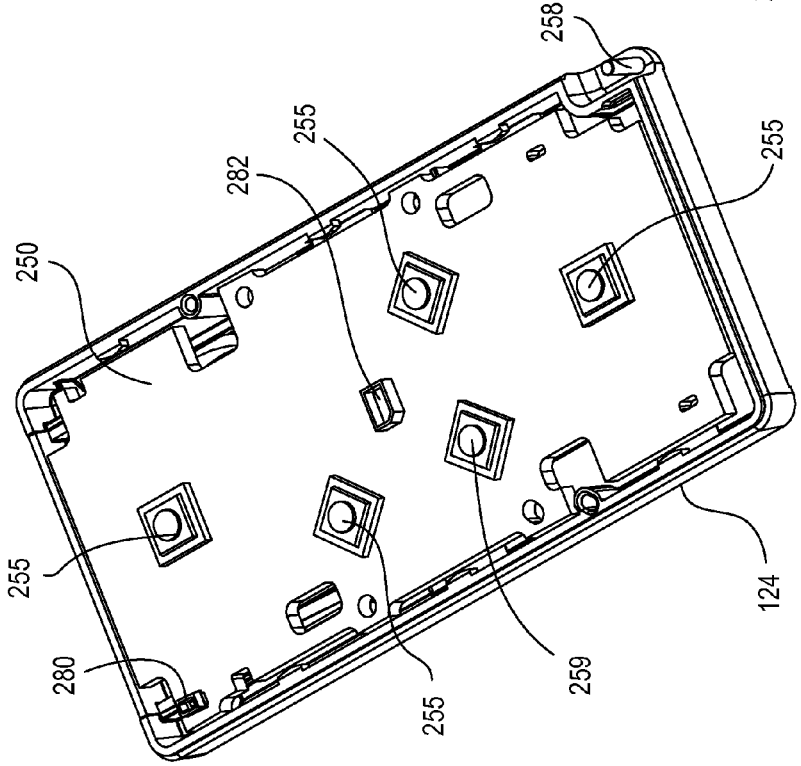
FIG. 4B is a front perspective view of a rear enclosure portion and a printed circuit board of the remote control of FIG. 1.

FIGS. 4B and 4C show the remote control 120 in a partially-disassembled state. Specifically, FIG. 4B is a front perspective view of the rear enclosure portion 124 and the PCB 250, and FIG. 4C is a rear perspective view of the front enclosure portion 122 and the buttons 130-138. The on button 130, the off button 132, the raise button 134, and the lower button 136 comprise actuation posts 254 for actuating mechanical tactile switches 255 mounted on the PCB 250. The preset button 138 comprises a switch actuation portion 256 and a pivoting portion 258. The remote control 120 comprises a preset button return spring 260 having a first end contacting the PCB 250 and a second end contacting the preset button 138, such that the return spring is positioned between the PCB and the preset button. The PCB 250 acts as a fixed support for the preset button return spring 260. When the preset button 138 is actuated, the preset button pivots about the pivoting portion 258 and the switch actuation portion 256 actuates a mechanical tactile switch 259 on the PCB 250. After the preset button 138 is released, the preset button return spring 260 operates to return the preset button to an idle position.

The raise button 134 and the lower button 136 further comprise pivoting structures 262 that rest on the PCB 250 (as shown in FIG. 4A), such that the raise and lower buttons 134, 136 are operable to pivot about the pivoting structures when the buttons are actuated. The preset button return spring 260 (that is positioned below the preset button 138) also operates to return the raise and lower buttons 134, 136 to their respective idle positions after an actuation of either of the raise or lower buttons. The preset button 138 comprises flanges 264 on which respective edges 266 of the raise and lower buttons 134, 136 rest (as shown in FIG. 4A). When, for example, the raise button 134 is depressed, the raise button pivots about the respective pivoting structure 262 and the actuation post 254 of the raise button actuates the mechanical tactile switch 254 under the raise button. At this time, the edge 266 of the raise button 134 contacts the respective flange 264 of the preset button 138 and the preset button return spring 260 does compress slightly. When the raise button 134 is subsequently released, the preset return spring 260 causes the flange 264 of the preset button 138 to contact the respective edge 266 of the raise button 134 to force the raise button back to the idle position. Thus, the single preset button return spring 260 is operable to cause all of the preset button 138, the raise button 134, and the lower button 136 to return to their respective idle positions, which is described in greater detail in U.S. patent application Ser. No. 12/643,126, filed Dec. 21, 2009, entitled CONTROL DEVICE HAVING A SINGLE RETURN SPRING FOR MULTIPLE BUTTONS, the entire disclosure of which is hereby incorporated by reference.

The remote control 120 further comprises return springs 270 connected to the bottom sides of the on button 130 and the off button 132 (as shown in FIG. 4C). The springs 270 each comprise square base portions 272 that are positioned adjacent bottom sides of the on button 130 and the off button 132. The base portions 272 have openings for receiving the corresponding mechanical switches 255 on the PCB 250, such that the actuation posts 254 can actuate the mechanical switches when the on button 130 and the off button 132 are actuated. The return springs 270 comprise legs 274 that extend from the base portions 272 to contact the PCB 250. When the on button 130 or the off button 132 is pressed, the legs 274 flex allowing the button to be depressed and the respective actuation post 254 to actuate the mechanical switch 255. When the respective button 130, 132 is then released, the return spring 270 forces the button away from the PCB 250 (i.e., returns the button to an idle position). The springs 270 have attachment openings 276 that are, for example, heat-staked to the bottom sides of the on button 130 and the off button 132.

The remote control 120 further comprises an indicator LED 280 and a night-light LED 282 both of which are mounted on the PCB 250. The indicator LED 280 is positioned to illuminate the visual indicator 140. The LED 282 is positioned directly behind the present button 138 (as shown in FIG. 4A) and forms part of the glow-in-the dark circuit 150 that will be described in greater detail below.

As mentioned above, the glow-in-the-dark night light 138A of the remote control 120 uses the preset button 138 as the glow-in-the-dark night light in the embodiment described. The glow-in-the-dark night light 138A is molded in a glow-in-the dark material or a plastic that is operable to glow. The glow-in-the-dark material can be a plastic such as a polycarbonate filled with a glow-in-the-dark pigment. Two examples of such glow-in-the dark pigments includes strontium aluminate and zinc sulfide. However, strontium aluminate is known to glow brighter and longer than zinc sulfide.

Figure 5:
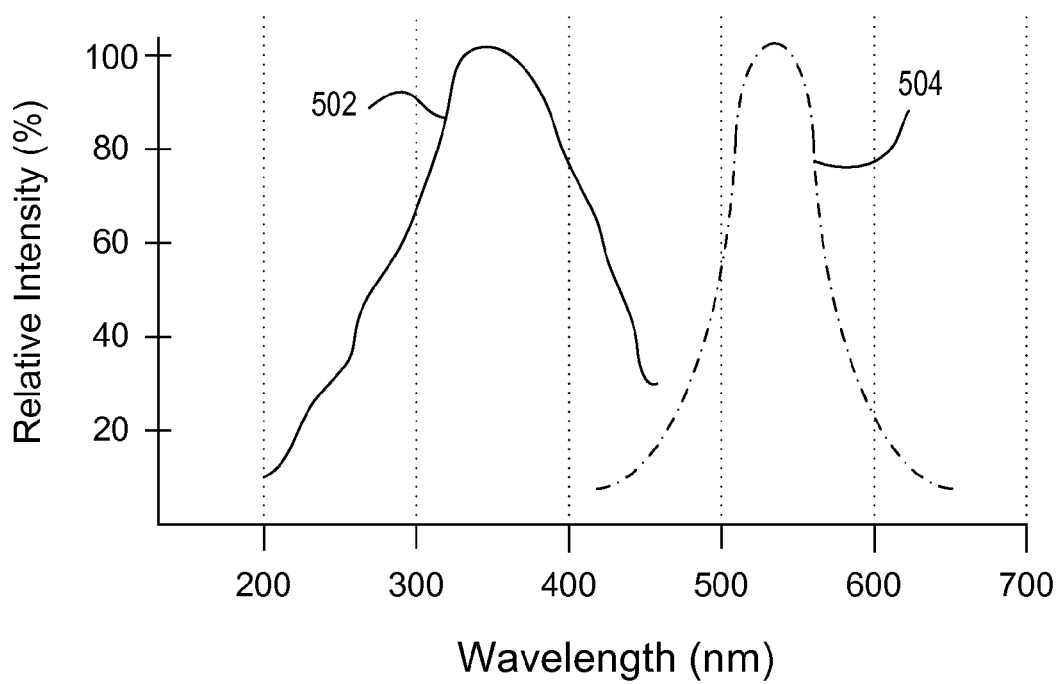
FIG. 5 is a graph of the excitation and emission spectra for an example glow-in-the-dark material, strontium aluminate.

FIG. 5 is a graph of the excitation and emission spectra for strontium aluminate. An excitation spectrum 502 of the strontium aluminate pigment is depicted by a solid line on the graph of FIG. 5. The excitation spectrum 502 illustrates that the pigment is most effectively excited by ultraviolet (UV) light (i.e., less than 400 nm) which is present in fluorescent lighting and other artificial lighting. An emission spectrum 504 of the strontium aluminate pigment is depicted by a dashed line on the graph of FIG. 5. The emission spectrum 504 illustrates that the pigment is able to emit visible light. In particular, the light emission of the strontium aluminate is in the green portion (i.e., ~550 nm) of the visible spectrum.

Figure 6:
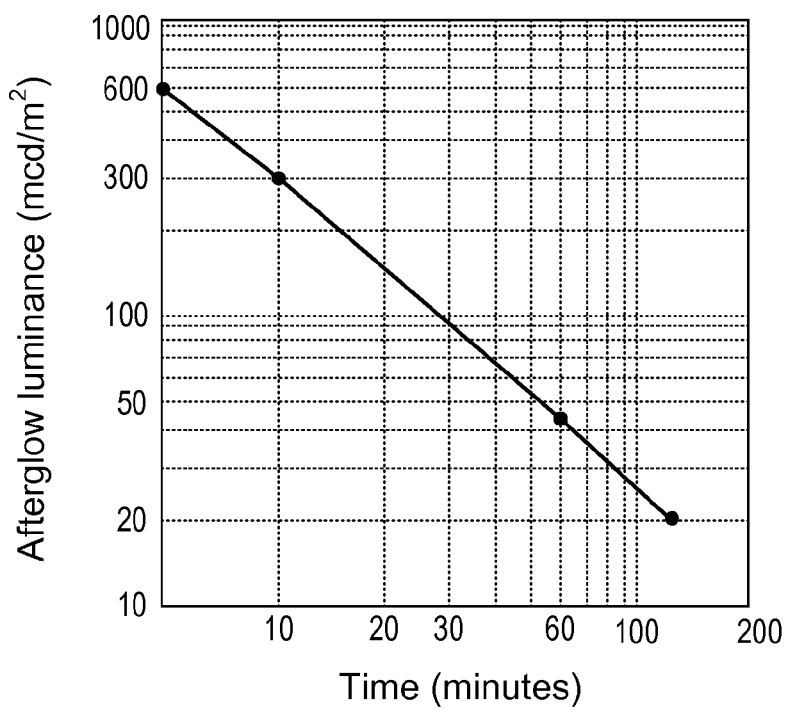
FIG. 6 is a graph of the afterglow time dependency of the glow-in-dark material.

After the strontium aluminate pigment has been sufficiently excited by UV light, the pigment is operable to emit light in the visible spectrum after the UV light is removed (i.e., to produce an afterglow), thus creating the glow-in-the-dark effect. FIG. 6 is a graph of the afterglow time dependency of the strontium aluminate. In short, FIG. 6 illustrates that the afterglow luminance of the strontium aluminate decays over time.

Figure 7:
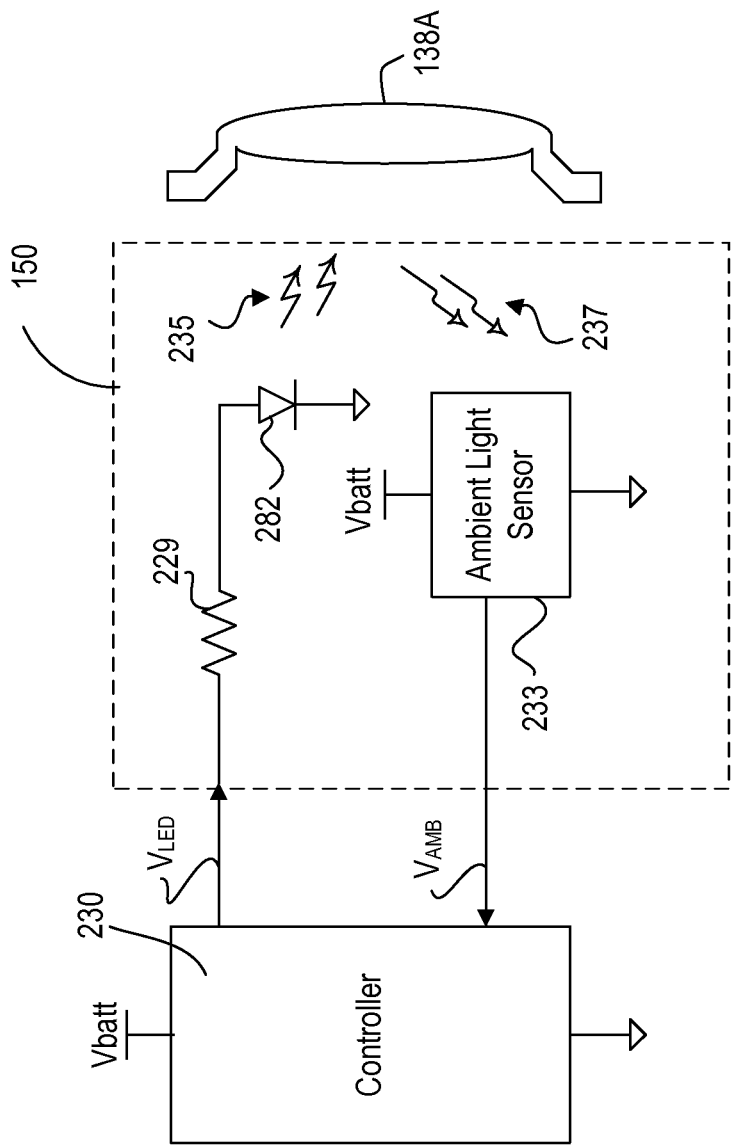
FIG. 7 is a simplified schematic diagram of a glow-in-the-dark circuit of the remote control of FIG. 1.
Figure 8:
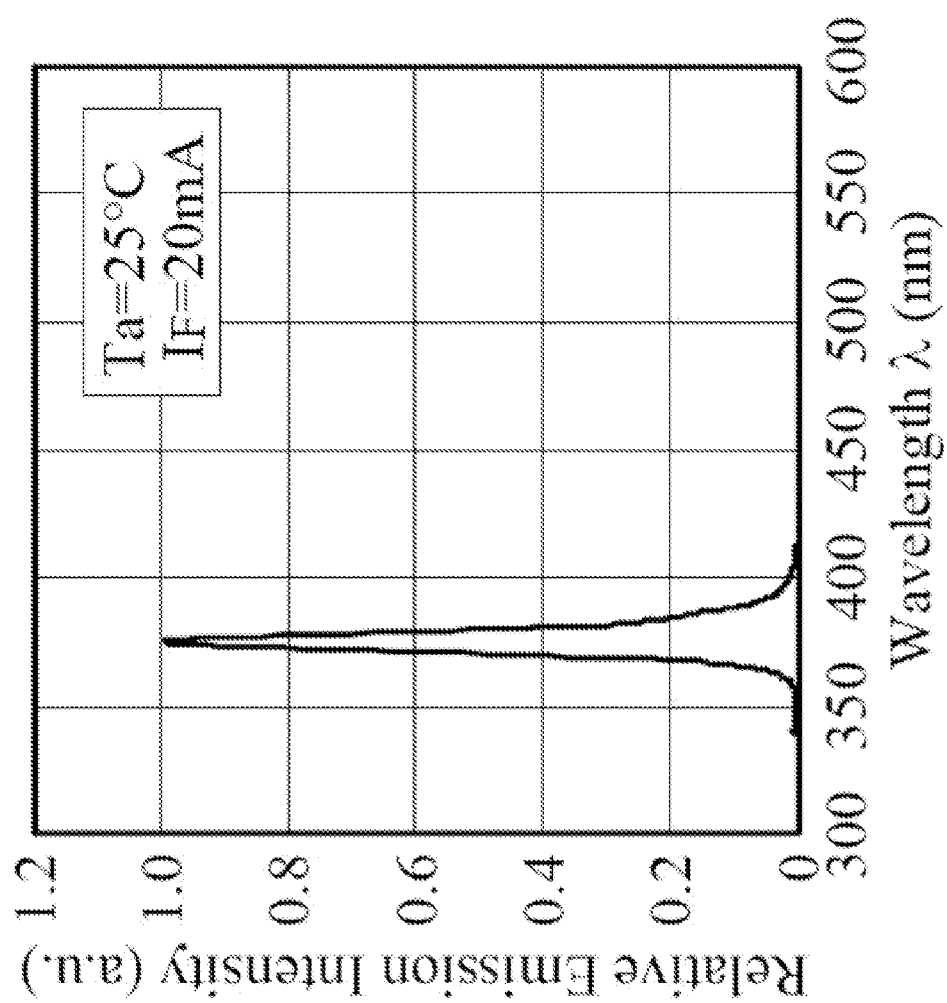
FIG. 8 is a graph of the emission spectrum for an example ultraviolet (UV) LED.

FIG. 7 is a simplified schematic diagram of the glow-in the-dark circuit 150 used to illuminate the glow-in-the-dark night light 138A of the remote control 120. The controller 230 provides an LED control signal $V_{LED}$ to the night-light LED 282 via a resistor 229 to control the state of the night-light LED. In one embodiment, the night-light LED 282 is a UV LED, and the controller 230 controls the night-light LED 282 to produce pulses of electromagnetic energy in the UV spectrum (i.e., UV light 235), which causes the plastic material of the glow-in-the-dark night light 138A to emit energy in the visible spectrum. For example, the night-light LED 282 may be a Nichia UV LED NSHU550A, the emission spectrum of which is illustrated in FIG. 8. Given the excitation spectrum 502 of the strontium aluminate pigment (FIG. 5), the emission spectrum of the example UV LED shown in FIG. 8 illustrates that the example UV LED can appropriately excite the strontium aluminate pigment. However, this is only one embodiment. The night-light LED 282 can also emit energy in any suitable spectrum including the visible spectrum to excite the material of the glow-in-the-dark night light 138A to emit light in the visible spectrum.

According to the described embodiment, the night-light LED 282 produces the pulsed UV light 235 that excites the glow-in-the-dark night light 138A and keeps it freshly glowing. Because the night-light LED 282 is pulsed by the controller 230 via the LED control signal $V_{LED}$, the glow-in-the-dark circuit 150 draws relatively little current from the battery 234 of the remote control 120 and does not cause a substantial reduction in battery life. According to an embodiment of the invention, the glow-in-the-dark circuit 150 further comprises an ambient light sensor 233 coupled to the controller 230. The ambient light sensor 233 is operable to measure the amount of ambient lighting in the surrounding area of the remote control 120. The ambient light sensor 233 provides to the controller 233 an ambient light signal $V_{AMB}$ that is representative of the amount of measured ambient light 237 in space. The controller 230 may use the ambient light signal $V_{AMB}$ to only pulse the night-light LED 282 during low ambient light conditions (i.e., when the glow-in-the-dark night light 138A is most beneficial), thus further conserving the life of the battery 234. According another embodiment of the invention, the glow-in-the-dark night light 138A may be semi-translucent such that ambient light 237 can be received by the ambient light sensor 233. As mentioned previously, during the time periods when the glow-in-the-dark material is not being provided with UV light 235 from the night-light LED 282, the glow-in-the-dark night light 138A continues to emit visible light, although decaying, but sufficient enough to enable it to be visible and thus located.

Figure 9:
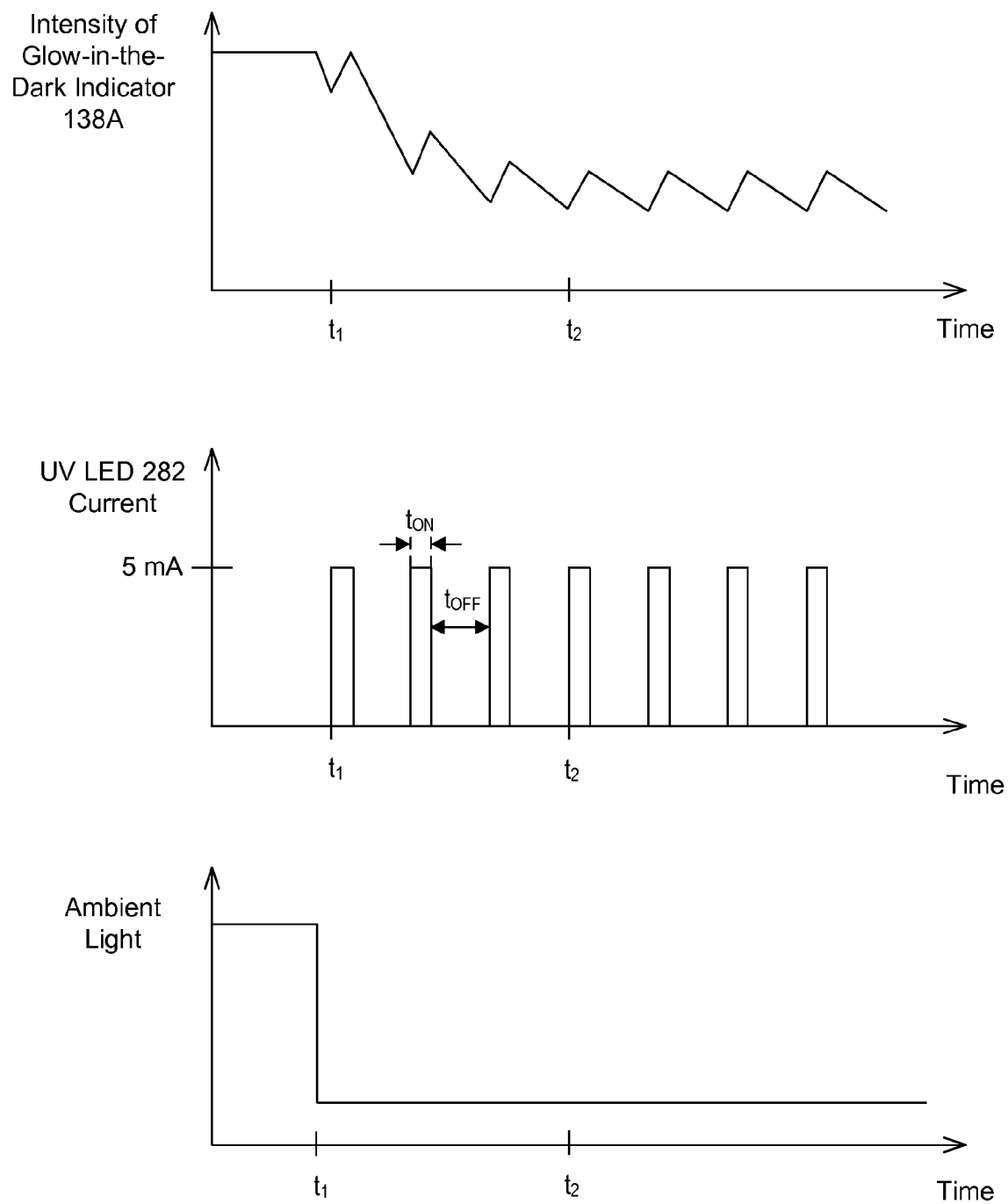
FIG. 9 shows waveforms for the glow intensity, ambient light and UV LED current.

FIG. 9 shows the waveforms for the button glow intensity, the current through the night-light LED 282, and the ambient light. In the embodiment shown in FIG. 9, the LED 282 is pulsed regularly during low light conditions only. As shown at time $t_1$ in FIG. 9, when the remote control 120 is put into a low ambient light environment (e.g., the lighting load 104 is turned off), the low ambient light condition is detected by the ambient light sensor 233. As a result, the controller 230 thereafter provides pulses to the night-light LED 282 such that the glow-in-the-dark night light 138A is partially recharged. In particular, the night-light LED 282 is driven on for an on time $t_{ON}$ and off for an off time $t_{OFF}$. For example, the on time may have a duration that is less than approximately one second, and the off time $t_{OFF}$ may vary from approximately 30 seconds to several minutes depending on the material of the glow-in-the dark night light 138A. During the on time $t_{ON}$ of the night-light LED 282, the intensity of the glow-in-the-dark night light 138A increases, and during the off time $t_{OFF}$, the intensity of the glow-in-the-dark night light slowly decays. Eventually, the intensity of the glow-in-the-dark night light 138A reaches an equilibrium point as shown at time $t_2$, wherein the recharging effect of the pulsed night-light LED 282 creates a relatively constant intensity of the glow-in-the dark night light 138A (with some minor ripple).

According to another embodiment of the present invention the ambient light sensor 233 can be used to change the on time $t_{ON}$ or the off time $t_{OFF}$ of the pulse, depending on the detailed ambient light levels. For example, the intensity of the glow of the glow-in-the-dark night light 138A needed at extremely low ambient light levels may be less than the intensity required at regular low ambient light level. Accordingly, when extremely low ambient light levels are detected by the ambient light sensor 233, the off time $t_{OFF}$ can be increased or the on time $t_{ON}$ decreased, thereby further conserving the life of the battery 234 of the remote control 120. Alternatively, the glow-in-the-dark circuit 150 need not comprise the ambient light sensor 233. Rather, the controller 230 could continuously provide pulses to the night-light LED 282 to keep the glow-in-the dark night light 138A sufficiently illuminated independent of the ambient light intensity.

According to a second embodiment of the invention, the remote control 120 can also be mounted to a wall plate 600, using mounting hardware described in U.S. application Ser. No. 12/399,126, mentioned above, as shown in FIG. 10. Whether used portably (as in FIG. 1) or installed in a particular location (as in FIG. 10), the glow-in-the-dark feature enables the remote control 120 to be easily located in low ambient light conditions.

Although an RF wireless remote control 120 is described, the invention can be employed with a remote control device operating on other principles or wavelengths, such as ultrasound or infrared. Further, the invention need not be employed only in remote control devices. Any type of load control device (e.g., a dimmer, a switch, a keypads, etc) that must be easily located in low ambient light conditions could implement the invention as described above. Other types of load control devices and remote controls are described in greater detail in commonly-assigned U.S. patent application Ser. No. 13/465,305, filed May 7, 2012, entitled CONTROL DEVICE HAVING A NIGHT LIGHT, the entire disclosure of which is hereby incorporated by reference.

Figure 10:
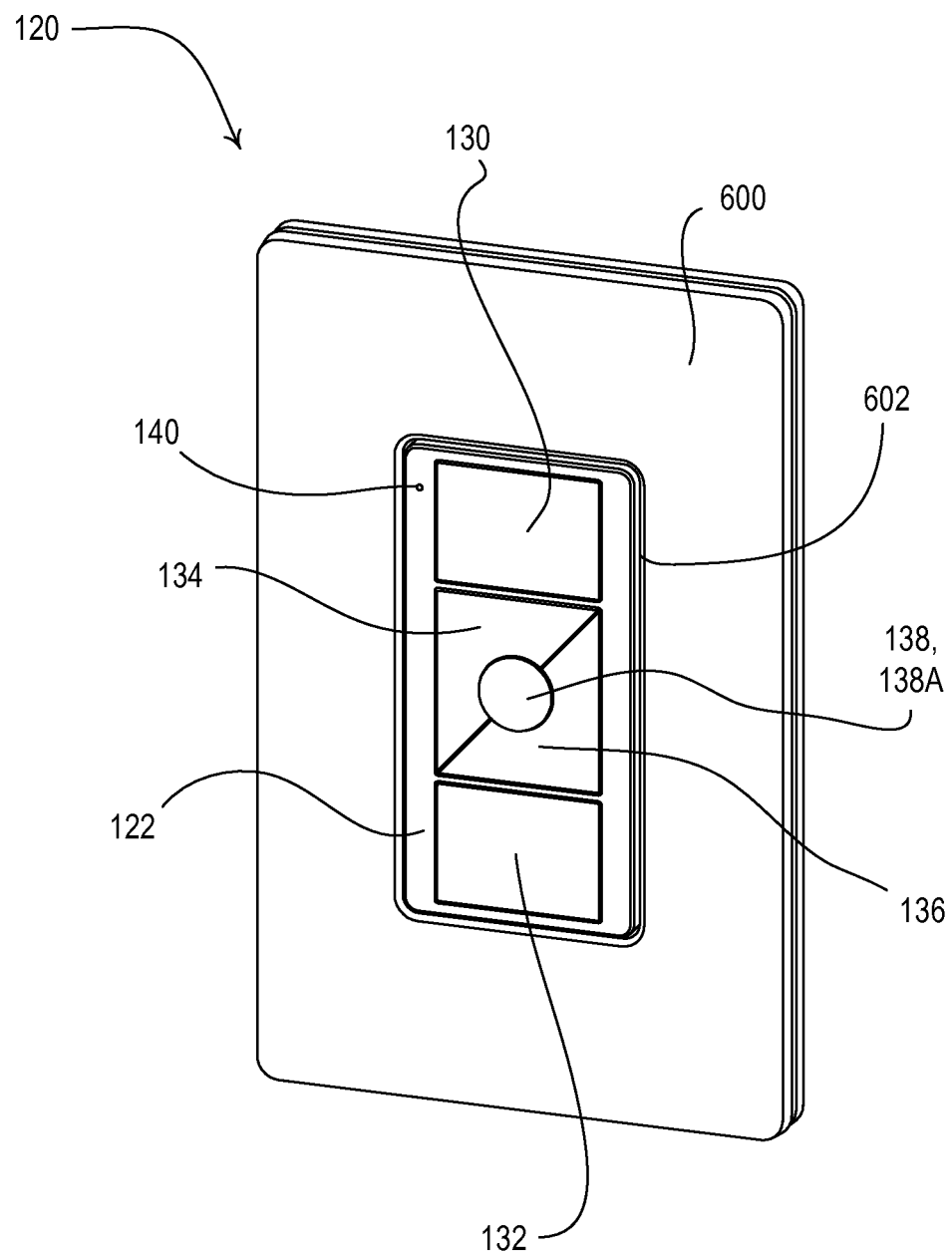
FIG. 10 is a perspective view of a remote control according to a second embodiment of the invention.

For example, the glow-in-the dark night light 138A could be provided on a wall-mounted load control device (such as, for example, the dimmer switch 110 shown in FIG. 1 or an electronic switch) for controlling the powered delivered from the AC power source 102 to the lighting load 104. The load control device could have a user interface similar to the remote control 120 as shown in FIG. 10. The load control device may comprise a "two-wire" load control that does not require a connection to the neutral side of the AC power source 102. The load control may include a power supply that conducts a charging current through the lighting load in order to generate a direct-current (DC) supply voltage $V_{CC}$ for powering low-voltage circuitry of the load control device. Some lighting loads may be susceptible to flickering and other undesirable behavior if the magnitude of the charging current conducted through the lighting load is too large. The load control device may comprise a glow-in-the-dark circuit that draws relatively little current from the power supply, such that the charging current needed to generate the DC supply voltage $V_{CC}$ is very low. Accordingly, the glow-in-the-dark circuit allows the load control device to provide the glow-in-the dark night light while avoiding flickering in the lighting load.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A remote control for a wireless control system, said remote control comprising:
    a controller;
    a wireless transmitter coupled to said controller;
    a battery for powering said controller and said transmitter;
    a housing for said controller, said transmitter, and said battery;
    an indicator device comprising a glow-in-the-dark material that has a luminance spectrum that decays with time after initial excitation; and
    an electromagnetic-energy-generating element for producing electro-magnetic energy to excite said glow-in-the-dark material to produce visible light to enable said remote control to be visible in low ambient light conditions,
    wherein said controller provides a pulse of electrical energy to said electromagnetic energy generating element on a periodic basis thereby to reduce energy usage from said battery, said pulse periodically recharging said glow-in-the-dark material with adequate energy to keep said glow in-the-dark material visible in said low ambient light conditions.

2. The remote control of claim 1, wherein said electromagnetic-energy-generating element comprises a light emitting diode (LED).

3. The remote control of claim 2, wherein said LED is an ultraviolet-light-producing LED.

4. The remote control of claim 3, wherein said glow-in-the-dark material comprises a plastic material infused with strontium aluminate.

5. The remote control of claim 2, wherein said glow-in-the-dark material comprises zinc sulfide.

6. The remote control of claim 1, wherein said pulses are provided continuously on a periodic basis.

7. The remote control of claim 1, further comprising:
an ambient light sensor coupled to said controller for measuring an ambient light level around the remote control;
wherein said controller produces said pulse only when said ambient light goes level below a threshold determined by said sensor.

8. The remote control of claim 1, wherein a period between pulses varies in a range from about 30 seconds to several minutes.

9. The remote control of claim 1, wherein a pulse width of said pulse is less than 1 second.

10. The remote control of claim 1, wherein said glow-in-the-dark material comprises an actuator button of said remote control.

11. The remote control of claim 1, further comprising:
an ambient light sensor coupled to the controller and wherein the controller varies a pulse period or pulse width of said pulse dependent on the ambient light level as determined by said sensor.

12. The remote control of claim 1, wherein said power source comprises one of a battery and a super capacitor.

13. A control device for controlling an electrical load receiving power from a power source, the control device comprising:
a housing for containing control electronics, said housing having a front enclosure portion;
at least one actuator located within an area of said front enclosure portion, said control electronics responsive to actuations of said actuator, said front enclosure portion and said actuator being made of a molded plastic, at least one of said front enclosure portion and said actuator containing an afterglow phosphorescent pigment;
an electromagnetic energy generating element mounted within said housing for producing electromagnetic energy directed toward said afterglow phosphorescent pigment to excite said afterglow phosphorescent pigment to produce visible light to render said control visible in low ambient light conditions;
a power source contained within said body for energizing said control electronics and said electromagnetic energy generating element; and
a pulse generator to produce a pulse of electrical energy to said electromagnetic energy generating element on a periodic basis thereby to reduce energy usage from said power source, said pulses having a frequency and pulse length to periodically recharge said phosphorescent pigment with adequate energy to maintain its afterglow to keep said control device visible in a darkened room.

14. The control device of claim 13, wherein said power source comprises one of a battery and a super capacitor.

15. The control device of claim 13, wherein said control device is portable.

16. The control device of claim 13, wherein said control device is wall mounted.

17. The control device of claim 13, wherein said control device comprises a remote control and said battery source comprises a battery.

18. The control device of claim 13, wherein said control device comprises a load control device adapted to be coupled in series electrical connection between an AC power source and the electrical load.

19. The control device of claim 13, wherein the electromagnetic-energy-generating element comprises a light-emitting diode (LED).

20. The control device of claim 13, wherein the LED is an ultraviolet-light-producing LED.

21. The control device of claim 13, wherein said pigment is one of strontium aluminate and zinc sulfide.

* * * * *